United States Patent
Bhattacharjee et al.

(10) Patent No.: US 10,963,901 B2
(45) Date of Patent: Mar. 30, 2021

(54) SYSTEMS AND METHODS FOR USE IN FACILITATING ENROLLMENT IN LOYALTY ACCOUNTS

(71) Applicant: MASTERCARD INTERNATIONAL INCORPORATED, Purchase, NY (US)

(72) Inventors: Manash Bhattacharjee, Jersey City, NJ (US); Prashant Sharma, Madison, NJ (US); Joseph Damon Hayes, Monclair, NJ (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 367 days.

(21) Appl. No.: 15/678,702

(22) Filed: Aug. 16, 2017

(65) Prior Publication Data

US 2019/0057412 A1     Feb. 21, 2019

(51) Int. Cl.
| | |
|---|---|
| *G06Q 30/02* | (2012.01) |
| *G06Q 20/36* | (2012.01) |
| *G06Q 20/38* | (2012.01) |
| *G06Q 30/00* | (2012.01) |
| *G06Q 20/32* | (2012.01) |

(52) U.S. Cl.
CPC ......... *G06Q 30/0226* (2013.01); *G06Q 20/36* (2013.01); *G06Q 20/387* (2013.01); *G06Q 20/3274* (2013.01)

(58) Field of Classification Search
USPC .......................... 705/35, 41, 14.27, 17, 14.25
See application file for complete search history.

(56) References Cited

U.S. PATENT DOCUMENTS

| | | | | |
|---|---|---|---|---|
| 2013/0159154 A1* | 6/2013 | Purves | .................. | G06Q 20/36 705/35 |
| 2015/0019317 A1* | 1/2015 | Mitchell | ............ | G06Q 30/0226 705/14.27 |
| 2015/0100486 A1* | 4/2015 | Green | .................... | G06Q 20/36 705/41 |
| 2016/0125445 A1* | 5/2016 | Jaladi | .................... | G06Q 20/108 705/14.27 |
| 2016/0162866 A9* | 6/2016 | Perkins | ................ | G07G 1/0045 705/17 |

* cited by examiner

*Primary Examiner* — Saba Dagnew
(74) *Attorney, Agent, or Firm* — Harness, Dickey & Pierce, P.L.C.

(57) ABSTRACT

Systems and methods are provided for facilitating enrollment of consumers in programs associated with entities. One exemplary method includes, in response to a selection of registration for an account with an entity, calling an application programming interface (API) associated with a virtual wallet platform, and receiving from the virtual wallet platform, via the API, a token associated with the entity. The method also includes displaying the token to a user and receiving, from the virtual wallet platform, a packet of personal identifying information for the user. The method further includes populating an application for registration of the user for the account with the personal identifying information included in the packet, and, upon an input from the user, enrolling the user in a program associated with the entity, based on the personal identifying information included in the packet, and providing the account to the user.

19 Claims, 5 Drawing Sheets

Airline Merchant 102
Loyalty Account

First name*: [ ]
Middle names (if shown on ID): [ ]
Last name*: [ ]   Suffix: [ ]
Gender*: ○ Male ○ Female
Date of birth*: Month [V]  DD* [ ]  YYYY* [ ]
Street address (apt.)*: [ ]
City/town/department*: [ ]
State/province/region/county*: [ ]   Zip/Postal code*: [ ]
Email address*: [ ]
Mobile phone number*: [ ]
Social Security number*: [ ]
[Accept and Enroll]

FIG. 6A

Airline Merchant 102
Loyalty Account

[John]
[William]
[Smith]   Suffix: [ ]
Gender*: ● Male ○ Female
Date of birth*: Jan [V]  01  2001
[123 Main Street]
[Cityville]
[Missouri]   [63105]
[email@enrollearn]
[123-123-1234]
[Enter Social Security number]
[Accept and Enroll]

FIG. 6B

SYSTEMS AND METHODS FOR USE IN FACILITATING ENROLLMENT IN LOYALTY ACCOUNTS

FIELD

The present disclosure generally relates to systems and methods for use in facilitating enrollment of users in loyalty accounts, and in particular, for use in populating information to the loyalty accounts, during enrollment of the users, through virtual wallet platforms associated with the users.

BACKGROUND

This section provides background information related to the present disclosure which is not necessarily prior art.

Consumers are known to purchase products (e.g., goods, services, etc.) from merchants. The purchases may be funded by the consumers through payment accounts, as presented to the merchants through physical cards (e.g., credit cards, debit cards, etc.) or virtual payment devices (e.g., virtual wallet applications, etc.).

From time to time, the merchants may offer loyalty programs to the consumers, whereby the consumers are associated with loyalty accounts and then gain points, miles, etc., in exchange for the purchases at the merchants (or otherwise, consistent with the terms and conditions of the loyalty programs). The points, miles, etc. may then be redeemed by the consumers for goods or services. Further, the loyalty accounts may be, simply, accounts that accrue points, miles, etc. based on the purchases, or they may be payment accounts that permit the consumers to also fund purchases at the merchants (and, potentially, at other merchants, etc.). Depending on the types of the loyalty accounts, the consumers may be required to provide a variety of information to the merchants in order to enroll with the merchants for the loyalty accounts. The information may include, for example, names, addresses, phone numbers, etc. for the consumers. The merchants then often rely on the information received from the consumers to enroll the consumers in the loyalty accounts, either in general or only if the consumers are subsequently deemed acceptable and/or worthy.

DRAWINGS

The drawings described herein are for illustrative purposes only of selected embodiments and not all possible implementations, and are not intended to limit the scope of the present disclosure.

FIGS. 4-6B are exemplary interfaces, which may be displayed to a consumer in connection with the system of FIG. 1 and/or the method of FIG. 3, for use in facilitating enrollment of the consumer in a loyalty account for a loyalty program.

Corresponding reference numerals indicate corresponding parts throughout the several views of the drawings.

DETAILED DESCRIPTION

The description and specific examples included herein are intended for purposes of illustration only and are not intended to limit the scope of the present disclosure.

Merchants provide loyalty programs to consumers to encourage loyalty of the consumers to the particular merchants. In connection therewith, the merchants often enroll the consumers to loyalty accounts for the loyalty programs through kiosks, point-of-sale (POS) terminals, and other devices at physical locations of the merchants, or through associated web applications (e.g., websites, etc.). The consumers then, in order to enroll for the loyalty accounts, fill out applications (e.g., electronic forms, etc.) with the merchants, where the applications rely on personal identifying information associated with the consumers, such as, for example, the consumers' names, addresses, phone numbers, dates of birth, social security numbers, payment account credentials, etc. Uniquely, in connection with such enrollment, the systems and methods herein permit the consumers to provide the personal identifying information to the merchants (as required for enrolment in various loyalty programs) via interaction between virtual wallet applications associated with the consumers and corresponding virtual wallet platforms. In particular, when enrolling a consumer for a loyalty account, a merchant calls or otherwise invokes an application programming interface (API) or otherwise interacts with a virtual wallet platform, and the virtual wallet platform, in turn, provides a merchant specific token to the merchant. The token is then displayed or otherwise provided to the consumer. And, the consumer enters and/or provides the token to his/her virtual wallet application (e.g., by scanning or otherwise capturing the token, etc.). The virtual wallet application then solicits authentication from the consumer for the interaction, and once authenticated, cooperates with the virtual wallet platform to transmit a packet to the merchant, which includes the personal identifying information for the consumer. The merchant next populates the loyalty account application associated with the enrollment with the received information. In connection therewith, the consumer is permitted to acknowledge the application and, specifically, the information populated therein (and potentially, modify the information), whereby the merchant enrolls the consumer in the corresponding loyalty program. In this manner, interactions between the merchant and the consumer (during such enrollment) may be reduced, while the application for the loyalty account is still completed with the personal identifying information of the consumer.

Figure 1:
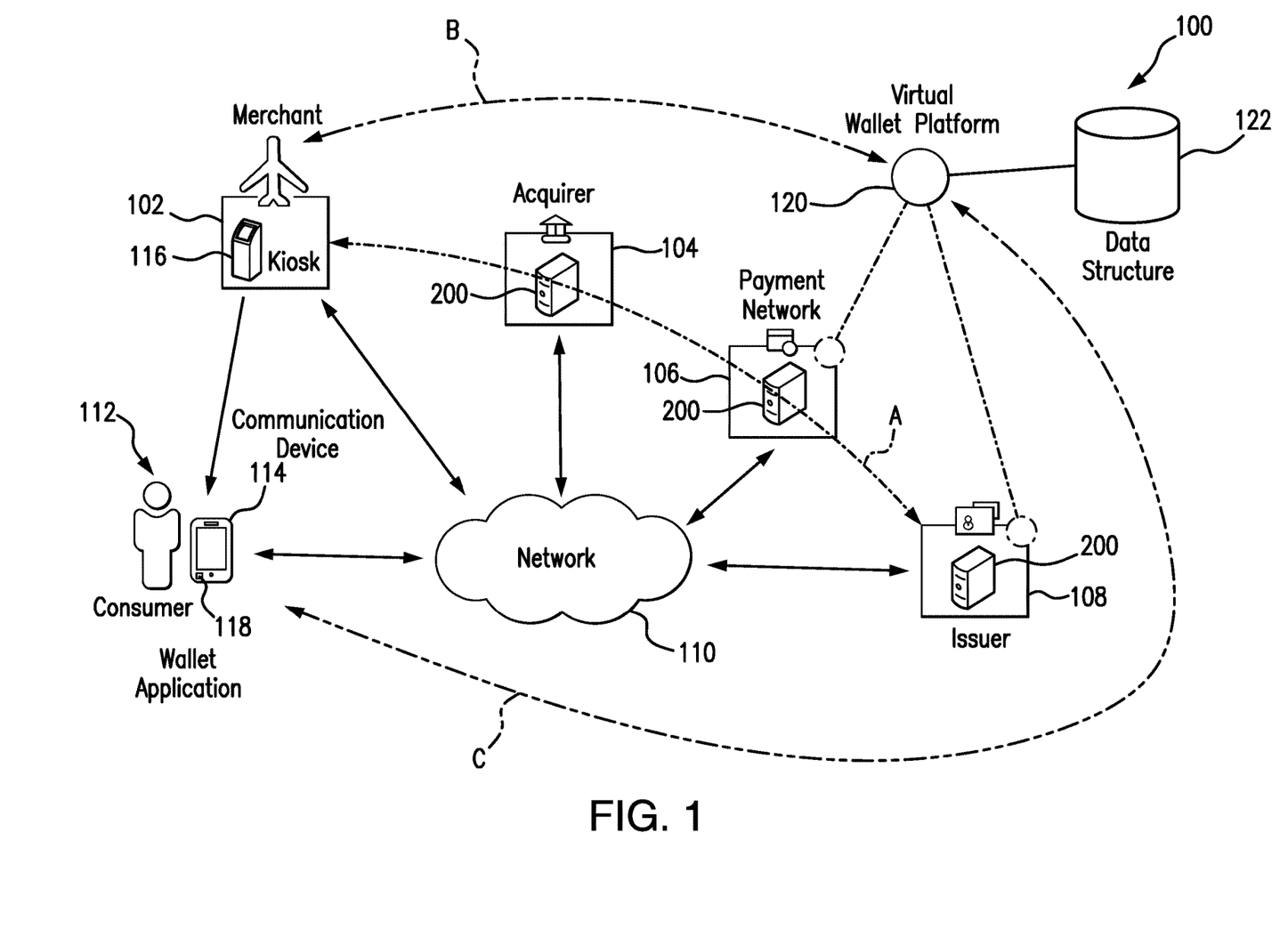
FIG. 1 is a block diagram of an exemplary system of the present disclosure suitable for use in facilitating enrollment of consumers in loyalty accounts with merchants.

FIG. 1 illustrates an exemplary system 100, in which the one or more aspects of the present disclosure may be implemented. Although the system 100 is presented in one arrangement, other embodiments may include systems arranged otherwise depending, for example, on types of merchants, types of loyalty programs, interactions between the merchants and virtual wallet applications and/or virtual wallet platforms, etc.

The illustrated system 100 generally includes a merchant 102, an acquirer 104 associated with accounts for the merchant 102, a payment network 106, and an issuer 108, each coupled to (and in communication with) network 110. The network 110 may include, without limitation, a local area network (LAN), a wide area network (WAN) (e.g., the Internet, etc.), a mobile network, a virtual network, and/or another suitable public and/or private network capable of supporting communication among two or more of the parts illustrated in FIG. 1, or any combination thereof. For example, the network 110 may include multiple different networks, such as a private payment transaction network made accessible by the payment network 106 to the acquirer 104 and the issuer 108 and, separately, the public Internet, which is accessible as desired to the merchant 102, the acquirer 104, the payment network 106, the issuer 108, and/or consumer 112 (i.e., communication device 114 associated with the consumer 112, etc.).

In the illustrated embodiment, the merchant 102 includes an airline merchant (without limitation and for purposes of illustration only) that offers a loyalty program to consumers, whereby the consumers are provided loyalty accounts to which miles are accrued for transactions with the merchant 102. Optionally, the loyalty accounts may also include payment accounts, whereby the consumers are further able to fund transactions therewith (e.g., at the merchant 102, at other merchants, etc.). Also in the illustrated embodiment, the merchant 102 is present, for example, at an airport, whereby the merchant 102 includes a kiosk 116 for providing (and/or facilitating) desired interactions with the consumers (e.g., for facilitating product purchases, enrollment in the loyalty program, redemptions of loyalty rewards, etc.). In addition, the merchant 102 may also (or alternatively) include a point-of-sale (POS) terminal or other computing device similarly configured to the kiosk 116 to provide desired interactions with the consumers.

Additionally, or alternatively, the merchant 102 may include (and/or provide or make available) a network-based application (e.g., a website, etc.), through which the consumers are able to interact with the merchant 102 (e.g., either when present at the merchant 102 or away therefrom, etc.). With that said, it should be appreciated that while the merchant 102 is generally described herein as performing one or more operations (or as being configured to do so), the merchant 102 may be provided in multiple discrete parts. For example, the kiosk 116 may include a loyalty application therein, which configures the kiosk 116 to interact with the consumer 112 (as described herein), while a separate computing device associated with the merchant 102 may be configured to generate loyalty account profiles and to interact with a virtual wallet platform to facilitate actual enrollment of the consumers in the merchant's loyalty program, etc.

Also in the system 100, the communication device 114 associated with the consumer 112 includes a virtual wallet application 118 (or virtual wallet, electronic wallet, or e-wallet, etc.). And, the virtual wallet application 118 is associated with and/or cooperates with a virtual wallet platform 120 (e.g., the MasterPass® wallet platform from MasterCard®, etc.). The virtual wallet application 118 may be provided by the payment network 106, the issuer 108 (in connection with a payment account issued to the consumer 112), or another entity, etc. and may include, without limitation, MasterPass® from MasterCard®, Apple Pay® from Apple®, PayWave® from Visa®, etc., or another suitable payment application. Similarly, the virtual wallet platform 120 is hosted by (as indicated by the dotted lines in FIG. 1) the payment network 106 and/or the issuer 108 (but may be hosted otherwise in other system embodiments). However, it should be appreciated that the virtual wallet platform 120 may be standalone, or incorporated elsewhere in the system 100, in other embodiments. That said, and as described in more detail hereinafter, the virtual wallet platform 120 is configured, by executable instructions, to operate as described herein, while the virtual wallet application 118 includes executable instructions that configure the communication device 114 to operate as described herein. What's more, the virtual wallet platform 120 and the virtual wallet application 118 are described herein as performing certain operations (i.e., as being configured to perform the operations). It should be appreciated that such operations may be performed by the virtual wallet platform 120, the wallet application 118, or a combination and/or cooperation thereof.

In addition, the consumer 112 is associated with a payment account issued to the consumer 112 by the issuer 108. As such, the consumer 112 is able to fund transactions with the merchant 102 (and other merchants) using the payment account. In the illustrated embodiment, the payment account is provisioned to the virtual wallet application 118, such that the consumer 112 is able to fund transactions with the merchant 102 (or other merchants) using the payment account by presenting the communication device 114 and/or the virtual wallet application 118 thereto.

With continued reference to FIG. 1, as needed, the acquirer 104, the payment network 106 and the issuer 108 (broadly, transacting institutions, etc.) cooperate to authorize, clear and settle a transaction between the merchant 102 and the consumer 112, funded by the consumer's payment account.

In particular, for example, when the consumer 112 desires to purchase a product from the merchant 102, the merchant 102 captures payment account credentials (e.g., a payment token, a primary account number (PAN), an expiration date, etc.) for the consumer's payment account from the virtual wallet application 118, for example, in the communication device 114, and compiles an authorization message (e.g., an authorization request, etc.) for the transaction. The authorization message may include, for example, the PAN for the consumer's payment account and an amount of the transaction, etc. The authorization message is transmitted, by the merchant 102, to the acquirer 104 (via the network 110). The acquirer 104, in turn, communicates the authorization message with the issuer 108 through the payment network 106 (via the network 110), for authorization of the transaction (generally along path A in FIG. 1). The issuer 108 then determines if the consumer's payment account is in good standing and if sufficient credit/funds to complete the transaction are associated with the payment account. In this example, if the issuer 108 approves/accepts the transaction, another authorization message (e.g., an authorization reply, etc.) is provided by the issuer 108 back to the merchant 102 authorizing the transaction, and the merchant 102 completes the transaction. The credit line or funds associated with the consumer's payment account, depending on the type of payment account, is then decreased by the amount of the transaction/payment, and the charge is posted to the payment account. The transaction is later cleared and settled by and between the merchant 102 and the acquirer 104 (in accordance with a settlement arrangement, etc.), and by and between the acquirer 104 and the issuer 108 (in accordance with another settlement arrangement, etc.).

In the illustrated embodiment, the merchant 102 is described as an airline merchant. However, it should be appreciated that the merchant 102 may include other types of merchants in other embodiments (such that the present disclosure is not limited to airline merchants). For example, in other embodiments, the merchant 102 may include a grocery store, a retail store, a department store, a home improvement store, a fast food restaurant, a hotel, a travel provider, etc. That said, in general, the merchant 102 may include any type of merchant that offers a loyalty program to consumers and corresponding loyalty accounts (regardless of type). In addition, while only one merchant 102, one acquirer 104, one payment network 106, one issuer 108, and one consumer 112 (and his/her associated communication device 114) are illustrated in FIG. 1, it should be appreciated that a different number of these entities and devices (and their associated components) may be included in the system 100, or may be included as a part of other system embodiments, consistent with the present disclosure.

Figure 2:
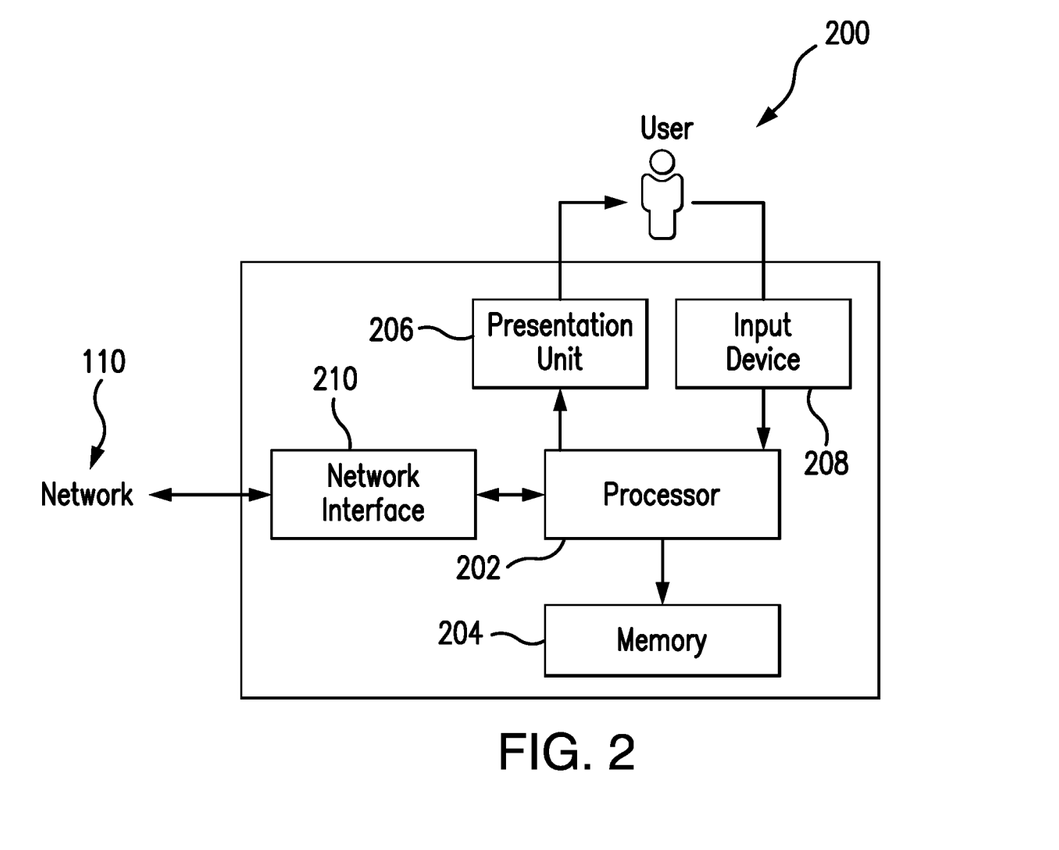
FIG. 2 is a block diagram of a computing device that may be used in the exemplary system of FIG. 1.

FIG. 2 illustrates an exemplary computing device 200 that may be used in the system 100. The computing device 200 may include, for example, one or more servers, workstations, personal computers, laptops, tablets, smartphones, PDAs, POS devices, etc. In addition, the computing device 200 may include a single computing device, or it may include multiple computing devices located in close proximity or distributed over a geographic region, so long as the computing devices are specifically configured to function as described herein. In the exemplary embodiment of FIG. 1, each of the acquirer 104, the payment network 106, and the issuer 108 are illustrated as including, or being implemented in, computing device 200, coupled to the network 110. In addition, the merchant 102 may include one or more computing devices consistent with computing device 200. For example, the kiosk 116 associated with the merchant 102 may include, or may be implemented in, a computing device consistent with computing device 200. Further, each of the communication device 114 associated with the consumer 112 and the virtual wallet platform 120, may be considered a computing device consistent with computing device 200. However, the system 100 should not be considered to be limited to the computing device 200, as described below, as different computing devices and/or arrangements of computing devices may be used. In addition, different components and/or arrangements of components may be used in other computing devices.

Referring to FIG. 2, the exemplary computing device 200 includes a processor 202 and a memory 204 coupled to the processor 202. The processor 202 may include one or more processing units (e.g., in a multi-core configuration, etc.). For example, the processor 202 may include, without limitation, one or more processing units (e.g., in a multi-core configuration, etc.), including a central processing unit (CPU), a microcontroller, a reduced instruction set computer (RISC) processor, an application specific integrated circuit (ASIC), a programmable logic device (PLD), a gate array, and/or any other circuit or processor capable of the functions described herein.

The memory 204, as described herein, is one or more devices that permit data, instructions, etc., to be stored therein and retrieved therefrom. The memory 204 may include one or more computer-readable storage media, such as, without limitation, dynamic random access memory (DRAM), static random access memory (SRAM), read only memory (ROM), erasable programmable read only memory (EPROM), solid state devices, flash drives, CD-ROMs, thumb drives, floppy disks, tapes, hard disks, and/or any other type of volatile or nonvolatile physical or tangible computer-readable media. The memory 204 may be configured to store, without limitation, transaction data, personal identifying information, tokens (e.g., checkout tokens such as quick response (QR) codes, etc.; payment tokens; etc.), account applications, forms, account profiles, payment account credentials, payment tokens, merchant identifiers, and/or other types of data suitable for use as described herein. Furthermore, in various embodiments, computer-executable instructions may be stored in the memory 204 for execution by the processor 202 to cause the processor 202 to perform one or more of the functions described herein, such that the memory 204 is a physical, tangible, and non-transitory computer-readable storage media. Such instructions often improve the efficiencies and/or performance of the processor 202 as described herein. It should be appreciated that the memory 204 may include a variety of different memories, each implemented in one or more of the functions or processes described herein.

In the exemplary embodiment, the computing device 200 includes a presentation unit 206 that is coupled to the processor 202 (however, it should be appreciated that the computing device 200 could include output devices other than the presentation unit 206, etc.). The presentation unit 206 outputs information, electronic forms, etc. either visually or audibly to a user of the computing device 200, for example, the consumer 112, etc. In addition, it should be appreciated that various interfaces (as described herein) may be displayed at computing device 200, and in particular at presentation unit 206, to display such information. The presentation unit 206 may include, without limitation, a liquid crystal display (LCD), a light-emitting diode (LED) display, an organic LED (OLED) display, an "electronic ink" display, speakers, etc. In some embodiments, presentation unit 206 includes multiple devices.

The computing device 200 also includes an input device 208 that receives inputs from the user (i.e., user inputs) such as, for example, acceptance of applications, selections to enroll with virtual wallets, confirmation to pay with virtual wallet applications, etc. The input device 208 is coupled to the processor 202 and may include, for example, a keyboard, a pointing device, a mouse, a stylus, a touch sensitive panel (e.g., a touch pad or a touch screen, etc.), another computing device, and/or an audio input device. Further, in various exemplary embodiments, a touch screen, such as that included in a tablet, a smartphone, or similar device, behaves as both a presentation unit and an input device.

In addition, the illustrated computing device 200 also includes a network interface 210 coupled to the processor 202 and the memory 204. The network interface 210 may include, without limitation, a wired network adapter, a wireless network adapter, a mobile network adapter (e.g., an NFC adapter, a Bluetooth adapter, etc.), or other device capable of communicating to one or more different networks, including the network 110. Further, in some exemplary embodiments, the computing device 200 includes the processor 202 and one or more network interfaces incorporated into or with the processor 202.

Referring again to FIG. 1, the virtual wallet platform 120 is associated with a data structure 122. The data structure 122 may be integrated into the virtual wallet platform 120, as indicated by the line, or may be separate therefrom and in communication with the virtual wallet platform 120 (e.g., via the network 110, etc.). As such, the data structure 122 is generally stored in memory (e.g., memory 204, etc.), for example, of the virtual wallet platform 120 (when integrated therein) or another computing device 200 (when separate from the virtual wallet platform 120). The data structure 122 includes account profiles for multiple consumers, including the consumer 112. The account profiles include personal identifying information for the consumers (e.g., names, addresses, contact information, birthdates, social security numbers, etc.), and further includes payment account credentials for the consumers' respective payment accounts provisioned to virtual wallet applications and associated with the virtual wallet platform 120.

In general in the system 100, when the consumer 112 interacts with the airline merchant 102 (e.g., to purchase an airline ticket, etc.), the merchant 102 offers the consumer 112 enrollment in the loyalty program offered by the merchant 102 (if not already enrolled). Specifically, when the interaction is at the physical location of the merchant 102, the kiosk 116 of the merchant 102 may be configured to offer a loyalty account to the consumer 112, whereby the consumer 112 may enroll in the loyalty program (for the loyalty account) through a conventional electronic form. Or, in connection with the present disclosure, the consumer 112 may enroll in the loyalty program (for the loyalty account) through use of the wallet application 118 at his/her communicating device 114.

When the consumer opts to enroll in the loyalty program at the merchant 102 with his/her wallet application 118, the merchant 102 (e.g., the kiosk 116, etc.) is configured to call or otherwise invoke an API associated with the virtual wallet platform 120, as indicated by path B in FIG. 1. In turn, the virtual wallet platform 120 is configured to respond to the merchant 102 with a token specifically associated with the merchant 102 (e.g., a checkout token, etc.). The token, as described in more detail below, may be provided in the form of a QR code or may be provided in the form of a number, sequence, symbol, code, or other computer-readable indicia, etc. Regardless of form, in response to the token, the merchant 102 (and in particular, the kiosk 116) is configured to display the token to the consumer 112. The consumer 112, and specifically, the communication device 114, as configured by the wallet application 118, captures the token (e.g., by a camera input device 208, etc.) and authenticates the consumer 112 at the communication device 114 (e.g., via solicitation of a personal identification number (PIN), biometric, etc.). Once the consumer 112 is authenticated, the communication device 114, as configured by the wallet application 118, solicits one or more selections and/or inputs (broadly, parameters) from the consumer 112, at the communication device 114, whereby the consumer 112 is able to specify personal identifying information to be provided (or not provided) to the merchant 102 for use in enrolling in the loyalty program (e.g., by selecting one mailing address over another, etc.). Thereafter, the communication device 114, as configured by the wallet application 118, transmits the token and the solicited/identified parameters, if any, to the virtual wallet platform 120, along path C in FIG. 1.

Upon receipt of the token and parameters, the virtual wallet platform 120 is configured to compile a packet of personal identifying information for the consumer 112 (e.g., name, address, contact information, date of birth, social security number, etc.) and transmit the packet to the merchant 102. The merchant 102, in turn, is configured to populate the personal identifying information from the packet into the application (e.g., an electronic form, etc.) for enrollment in the loyalty account. The merchant 102 is configured to display the application to the consumer 112, with the personal identifying information populated therein, whereupon the consumer 112 is able to verify and accept (or modify) the information and also submit the application. Once the application is submitted (or approved) by the consumer 112, the merchant 102 is configured to accept or decline the enrollment of the consumer 112 in the loyalty program, and to generate and store a loyalty account profile for the consumer 112 in memory (e.g., the memory 204 of a computing device 200 associated with the merchant 102, etc.).

While transmission of the personal identifying information from the consumer 112 to the merchant 102 (via the virtual wallet platform 120) is described above with reference to use in the merchant application, it should be appreciated that the merchant 102 may be configured to handle and/or display the personal identifying information to the consumer 112 in one or more other manners (other than via an electronic application), so long as the personal identifying information, or part thereof, is employed to enroll the consumer in the loyalty account.

In addition, in various embodiments, when the merchant's loyalty program in which the consumer 112 is enrolled and/or the loyalty account issued to the consumer 112 is associated with one or more fees, the merchant 102 may be configured to initiate a transaction for the one or more fees once enrollment is completed (or in connection therewith). In particular, the merchant 102 (with the consumer's consent) may be configured to submit a transaction to the virtual wallet platform 120, along path B in FIG. 1, which, in turn, is configured to provide one or more payment credentials (e.g., a PAN, a payment token, etc.) for the consumer's payment account back to the merchant 102. The merchant 102, upon receipt of the payment credential(s), is configured to submit the transaction for the one or more fees to the acquirer 104, which then coordinates authorization, clearing and settlement of the transaction, as generally described above with reference to path A in FIG. 1.

Figure 3:
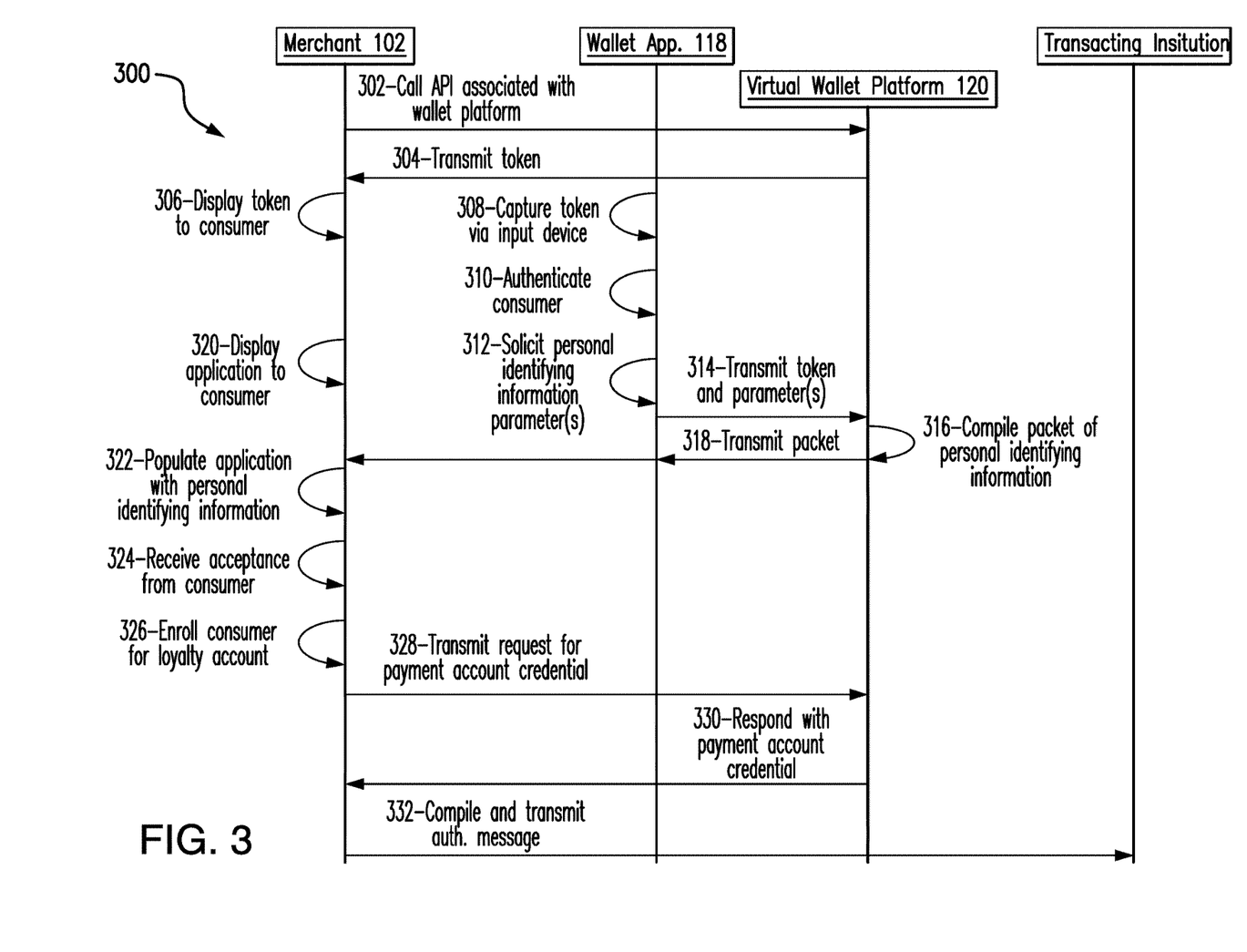
FIG. 3 is an exemplary method for use in facilitating enrollment of a consumer in a loyalty account for a loyalty program associated with a merchant based on information provided by the consumer to the merchant via a virtual wallet platform, and which may be implemented in the system of FIG. 1.

FIG. 3 illustrates an exemplary method 300 for facilitating enrollment of a consumer in a loyalty program associated with a merchant (and in particular, for a loyalty account associated with the loyalty program). The exemplary method 300 is described as implemented in the merchant 102, the wallet application 118, and the virtual wallet platform 120 of the system 100, in connection with the consumer 112 and the communication device 114, and also with reference to the computing device 200. However, it should be understood that the methods herein are not limited to the exemplary system 100 or the exemplary computing device 200. Likewise, the systems and the computing devices herein should not be understood to be limited to the exemplary method 300. Further, the method 300 is described with reference to exemplary interfaces 400-600 included in FIGS. 4-6B. The exemplary interfaces 400-600, however, are provided for purposes of illustration, and thus, should not be understood to the limit the present disclosure (as other interfaces with other content and/or formats may be used in other embodiments).

Figure 4:
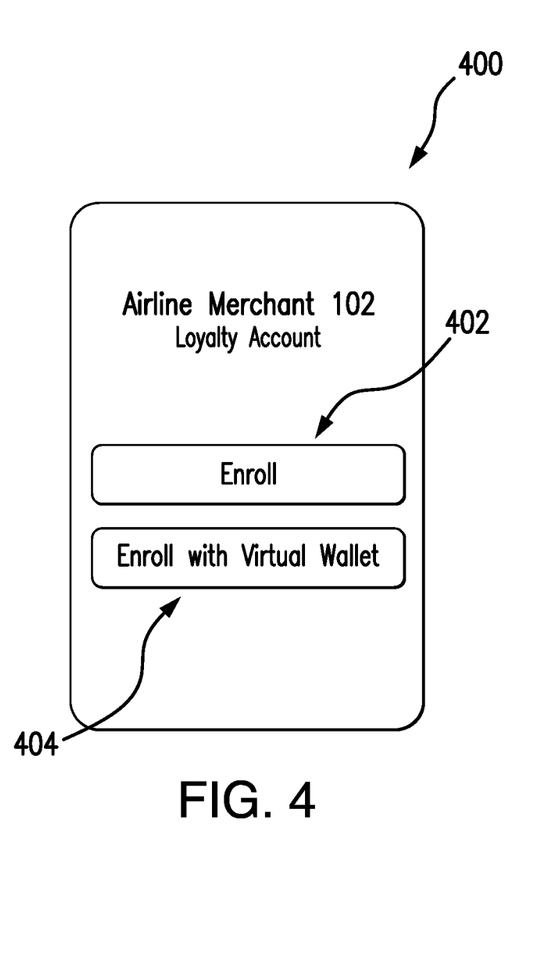

As described above in the system 100, in connection with one or more interactions between the consumer 112 and the airline merchant 102, the merchant 102 may offer to enroll the consumer 112 in its loyalty program (specifically, for a loyalty account associated therewith). Uniquely herein, when the offer to enroll is provided, the merchant 102 provides the consumer 112 an option to enroll via the consumer's wallet application 118. That said, FIG. 4 illustrates an exemplary interface 400 that may be displayed to the consumer 112 by the merchant 102, at the kiosk 116, for example, to facilitate and/or initiate such enrollment (based on the consumer's wallet application 118). The illustrated interface 400 includes an indication of the offer, i.e., that the offer is from the merchant 102 to enroll for the loyalty account, and options 402, 404 to either "Enroll" in a conventional manner or to "Enroll with Virtual Wallet." In response, in the exemplary method 300, the consumer 112 selects the button 404 to enroll with the virtual wallet.

As shown in FIG. 3, in response to the selection by the consumer 112 to enroll for the merchant's loyalty program with his/her virtual wallet, the merchant 102 calls or otherwise invokes the API associated with the virtual wallet platform 120, at 302 (as indicated by path B in FIG. 1) (e.g., via a "shoppingCartApi" call, etc.). The virtual wallet platform 120 identifies the airline merchant 102 based on the interaction, and based on the identity of the merchant 102, transmits a token to the airline merchant 102, at 304 (e.g., a checkout token, etc.). The token is specific to the airline merchant 102 and may include a variety of symbols, numbers, indicators, etc., which are unique to the merchant 102 and known to the virtual wallet platform 120. In this example, the token includes at least a merchant identifier associated with the merchant 102, represented as a QR code. In various embodiments, the token (e.g., the QR code, etc.) may be encoded with one or more of a name of the loyalty program, a country code for the merchant 102, tier levels for the loyalty program, a loyalty category, a name of the merchant 102 (if different from loyalty program provider), a date, a time, a subscription amount for the loyalty program, a subscription value, a currency, a subscription duration, an identifier of the particular payment application 118 used by the consumer 112 (e.g., a MasterPass number, etc.), etc.

Figure 5:
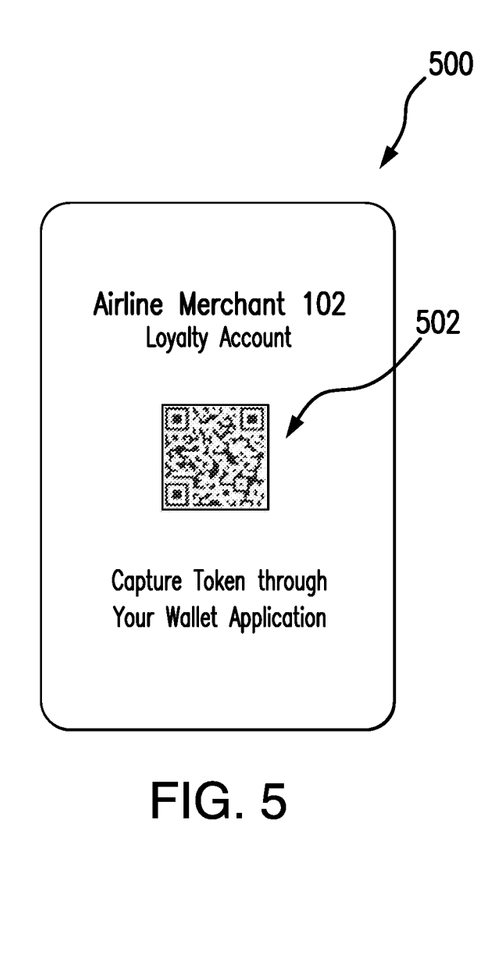

In turn, the airline merchant 102 receives the token from the virtual wallet platform 120 (e.g., again via the API along path B in FIG. 1, etc.) and displays, at 306, the token at a display output device 206 of the kiosk 116, whereupon the token is viewable by the consumer 112 (e.g., via a "webviewContent" call, etc.). In response, the consumer 112, via the communication device 114 and/or wallet application 118 (and the input device 208 associated therewith), captures the token, at 308. FIG. 5 illustrates an exemplary interface 500 that may be displayed at the kiosk 116, and through which a QR code 502 of the token may be presented to the consumer 112 in the context of an offer to enroll in the merchant's loyalty program. In addition to the QR code 502, the exemplary interface 500 also includes instructions for the consumer 112 to capture the QR code 502 with his/her communication device 114 (and specifically, via the wallet application 118 included therein). For example, the consumer's communication device 114 includes a camera input device 208, which the consumer may point toward the QR code 502 displayed in the interface 500 and (automatically or in response to a consumer input) use to capture an image of the QR code 502 as instructed.

Thereafter in the method 300, the wallet application 118, via the communication device 114, authenticates, at 310, the consumer 112 via a PIN, a biometric, or another form of information associated with or known to the consumer 112 (e.g., the wallet application 118 requests input by the consumer 112 of the requested information in order to authenticate the consumer 112 based on comparison of the information then proved by the consumer 112 to reference information previously obtained, etc.). When a biometric is used for such authentication of the consumer 112, for example, the camera input device 206 may be used, again, to capture an image of the consumer's face or a fingerprint of the consumer 112, which is then compared to a reference biometric stored in the communication device 114 (or at the virtual wallet platform 120, which may then provide the reference biometric to the communication device 114 for use in authenticating the consumer 112 or which may itself perform the authentication). Regardless of form, when there is a match between the information provided by the consumer 112 and the reference information used for comparison, the wallet application 118 determines the consumer 112 to be authenticated. Conversely, however, when there is no match, the wallet application 118 determines the consumer to not be authenticated.

Next, once the consumer 112 is authenticated, the wallet application 118, via the communication device 114, solicits, at 312, one or more parameters from the consumer 112 indicative of the personal identifying information for the consumer 112 to be provided to the merchant 102. More specifically, the virtual wallet application 118 includes an account profile for the consumer 112, which may include a variety of different personal identifying information. Some of the information may be duplicative (e.g., multiple different physical addresses, different phone numbers, different email addresses, etc.), while other information may be more sensitive than other information (e.g., social security number, etc.). The virtual wallet application 118, therefore, may solicit, at 312, one or more different parameters from the consumer 112, to permit the consumer 112 to select which information to provide or not provide (e.g., one address over another for a shipping address, exclude the consumer's social security number, etc.). In this manner, the consumer 112, via the wallet application 118, while providing personal identifying information to the airline merchant 102, may have the option to provide only certain personal identifying information (e.g., the bare minimum information necessary for enrollment in the loyalty program, such as the consumer's name, mailing address, phone number, date of birth, email address, and gender; etc.), while excluding other information.

Once the parameters (if any) are received from the consumer 112, the virtual wallet application 118 transmits the captured token and the received parameters to the virtual wallet platform 120, at 314. In turn, the virtual wallet platform 120 verifies the token and compiles, at 316, a packet of the personal identifying information received for the consumer 112 (consistent with the parameter(s) received from the wallet application 118). For example, for facilitating enrollment of the consumer 112 in the merchant's loyalty program, the packet may include the consumer's name, mailing address, phone number, date of birth, email address, gender, consumer preferences (e.g., language, country of residence, time zone, etc.), etc. Once compiled, the packet is then transmitted, by the virtual wallet platform 120 directly to the airline merchant 102 (e.g., the kiosk 116, etc.) (as identified by the token), or to the wallet application 118 and then, by the wallet application 118, to the airline merchant 102 (e.g., the kiosk 116, etc.) (as identified by the token), at 318 (e.g., via a "deepLink(messengerUrl)" call, etc.).

In the meantime in the method 300, after the token is displayed to the consumer 112 (at 306) or generally simultaneously therewith, the kiosk 116 (broadly, the merchant 102) displays an application (e.g., an electronic form, etc.) to the consumer 112, at 320, for use in facilitating enrollment of the consumer 112 in the merchant's loyalty program. Then, upon receipt of the packet of information from the virtual wallet platform 120, the airline merchant 102 populates, at 322, the application with the consumer's personal identifying information included in the packet. The consumer 112 is allowed to review the application, and the populated information, for accuracy and approve/accept the application as appropriate (or edit the data as necessary). In addition, the consumer 112 may further provide other information, for example, related to the loyalty program (but not personal identifying information) such as a name of the loyalty program, a type of the loyalty program, tier levels for the loyalty program (or a desired one of the tier levels for enrollment), a loyalty category, a subscription amount and/ or duration for the loyalty program, etc. (e.g., when not provided previously, or when the consumer 112 elects to enroll; etc.).

When the consumer 112 accepts the application, the merchant 102 receives, at 324, the acceptance from the consumer 102, and then, at 326, enrolls the consumer 102 for a loyalty account with the merchant 102. This may include, for example, approving the consumer 112 for the account, compiling a loyalty account profile for the consumer 112 and then storing the loyalty account profile in a data structure (not shown) associated therewith (e.g., in memory 204 of a computing device 200 associated with the merchant 102, etc.). The consumer 112 is then permitted to continue with interactions with the merchant 102, as desired or needed, whereby the consumer 112 will then be able to accrue airline miles for his/her loyalty to the merchant 102 and/or the loyalty account.

Figure 6A:
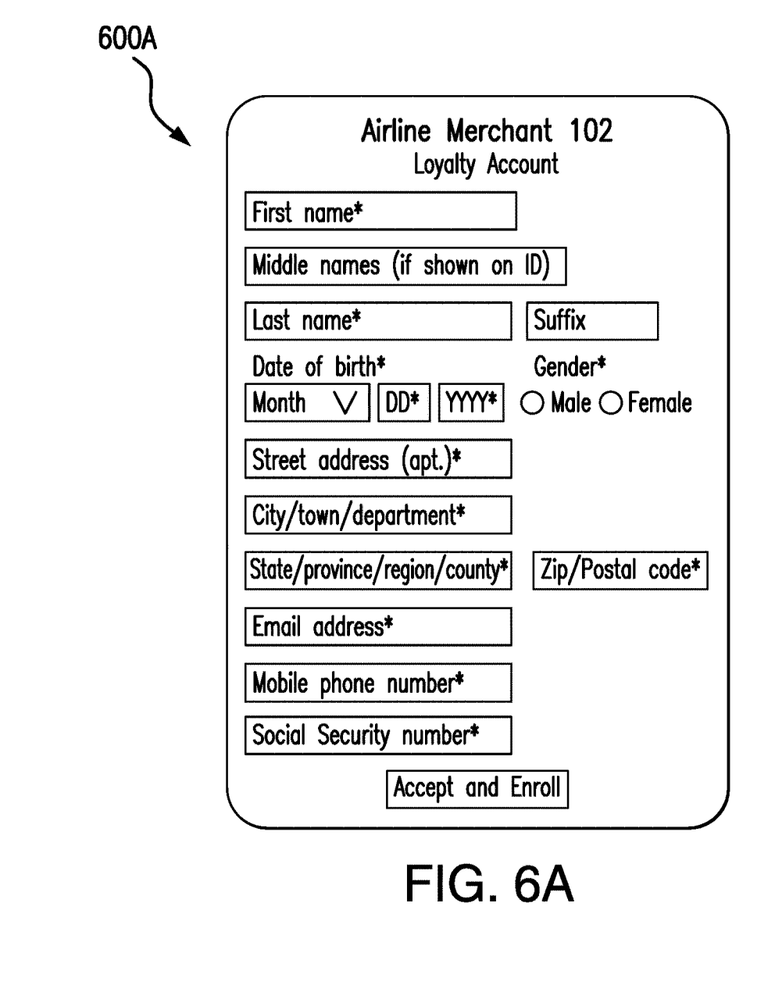
Figure 6B:
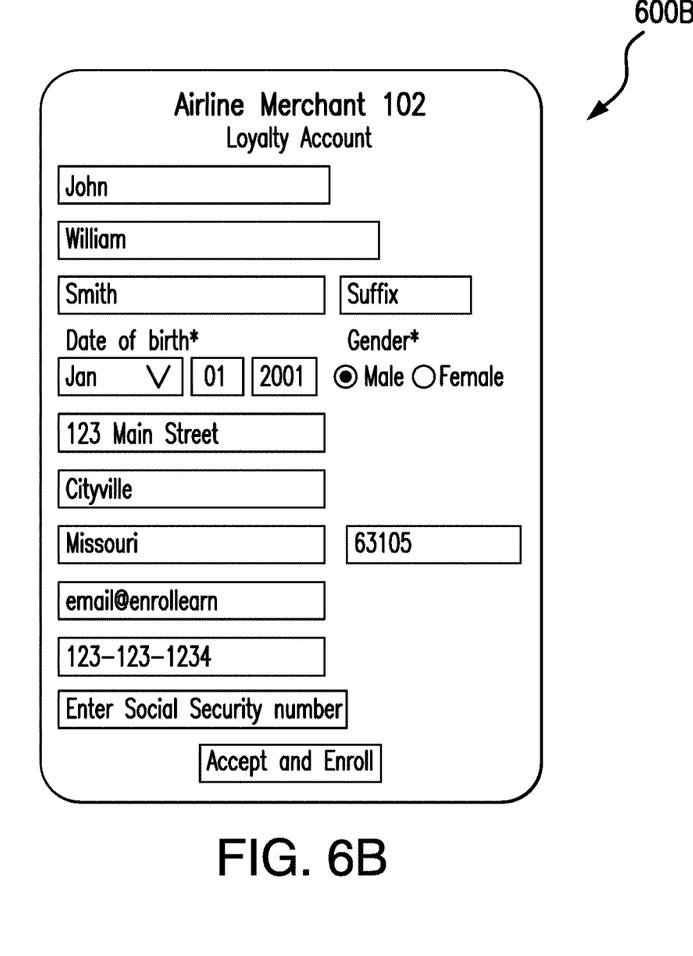

In connection therewith, FIG. 6A illustrates an exemplary interface 600 that may be displayed to the consumer 112 at the kiosk 116 to present the application. As shown, the application includes numerous fields required to be filled by the consumer 112 in connection with enrolling in the loyalty program. Specifically, the application includes fields for the consumer's name, address, gender, date of birth, email address, phone number, and social security number. Further, when displayed after the consumer 112 has opted to enroll with the virtual wallet application 118, one or more of these fields may be greyed out or otherwise protected or not editable, such that the consumer 112 is unable to provide the information to the fields of the application (because such information will be provided via the consumer's virtual wallet application 118). And, FIG. 6B illustrates the exemplary interface 600 with each of the fields of the application populated with the appropriate personal identifying information (e.g., upon receipt of such information from the virtual wallet platform 120, at 322 in the method 300; etc.). When necessary, or desired, the consumer 112 may be allowed to edit the information included in the fields of the application, or to further provide information in the application not included in the packet received from the virtual wallet platform 120 (e.g., the consumer's social security number in FIG. 6B, etc.). For example, a required field of the application (as displayed in the interface 600) may be indicated by an asterisk (i.e., indicating that the field must include the requested information prior to the application being a submitted). If that information is not provided in the packet, from the virtual wallet platform 120, it may be up to the consumer 112 to subsequently add the information to complete the application (e.g., the consumer's social security number in FIG. 6B, etc.). Finally, when the application is complete, and reviewed by the consumer 112, the consumer 112 is able to select the "Accept and Enroll" button (broadly, provide an input to the interface 600) at the bottom of the exemplary interface 600.

In this exemplary embodiment, the loyalty account provided by the airline merchant 102 to the consumer 112 is associated with a fee, such as, for example, an annual fee of $35.00. Thus, prior to completing the enrollment of the consumer 112, the airline merchant 102 may attempt to collect the fee from the consumer 112. That said, in the method 300, for example, the airline merchant 102 is already interacting with the virtual wallet platform 120, at the permission of the consumer 112. As such, once the application has been accepted and the enrollment of the consumer 112 is continued (and/or the virtual wallet platform 120 indicates the payment is due, or initiates the payment (e.g., via an "onSelectionEvent" call, etc.), the merchant 102, via the kiosk 116, may solicit consent of the consumer 112 to charge the fee to the consumer's payment account provisioned to the virtual wallet application 118 (prior to requesting a payment token from the virtual wallet platform 120). Upon receipt of consent from the consumer 112, the airline merchant 102 then transmits, at 328, a transaction request for the fee to the virtual wallet platform 120 (e.g., via a "checkout(checkoutToken)" call, etc.), and in particular, a request for one or more payment account credentials for the consumer's payment account provisioned to the virtual wallet application 118. In response, the virtual wallet platform 120 provides, at 330, the one or more requested payment account credentials (e.g., a payment token, a PAN, an expiration date, etc.).

At 332, the airline merchant 102 then compiles an authorization message (including the one or more payment account credentials, the fee amount, etc.) for the desired transaction and transmits the authorization message to the transacting institution for processing (e.g., to the acquirer 104, etc.) (e.g., via a "capturePayment(pan)" call, etc.), as generally described above in the system 100. Upon authorization of the transaction for the fee, the airline merchant 102 completes the enrollment of the consumer 112. It should be appreciated that while the fee associated with the loyalty account is paid through the virtual wallet platform 120 in this example, the fee may be paid otherwise in other method embodiments (e.g., via other payment accounts, etc.).

Finally in the method 300, regardless of whether or not a fee is required or paid for enrollment of the consumer 112 in the loyalty program, the airline merchant 102 may further interact with the consumer 112, at the kiosk 116, to, for example, provide a loyalty account number, or otherwise solicit options and/or additional transactions from the consumer 112 relating to the loyalty program and/or the merchant 102 in general. In one example, the kiosk 116 may seek permission from the consumer 112 to review prior transactions to the consumer's payment account provisioned to the virtual wallet application 118 to provide points for prior transactions for travel with the airline merchant 102 (i.e., prior qualifying transactions).

In view of the above, the systems and methods herein permit consumers to rely on virtual wallet applications and/or virtual wallet platforms to provide and/or populate personal identifying information into applications for loyalty accounts or other suitable accounts. In this manner, consumers may avoid the time spent to fill out the applications and/or enroll with the accounts, while still providing complete personal identifying information in the applications. Further, by providing the personal identifying information through the wallet applications and/or wallet platforms, such information may not need to be provided in person to employees at the merchants, etc. (potentially adding a level of security for the consumers to the application process). Further still, the virtual wallet applications and/or the virtual wallet platforms provide the personal identifying information, such that there is no need for the consumers to be logged-into, familiar to, enrolled with, or otherwise associated with (or to have previously interacted with or have accounts with) the merchants, the kiosks, or other computing devices associated with enrollment in the loyalty accounts in order for the information to be populated.

Again and as previously described, it should be appreciated that the functions described herein, in some embodiments, may be described in computer executable instructions stored on a computer-readable media, and executable by one or more processors. The computer-readable media is a non-transitory computer-readable storage medium. By way of example, and not limitation, such computer-readable media can include RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Combinations of the above should also be included within the scope of computer-readable media.

It should also be appreciated that one or more aspects of the present disclosure transform a general-purpose computing device into a special-purpose computing device when configured to perform the functions, methods, and/or processes described herein.

As will be appreciated based on the foregoing specification, the above-described embodiments of the disclosure may be implemented using computer programming or engineering techniques including computer software, firmware, hardware or any combination or subset thereof, wherein the technical effect may be achieved by performing at least one of the following steps: (a) in response to a selection of registration for a loyalty account with a merchant, calling an application programming interface (API) associated with a virtual wallet platform; (b) receiving from the virtual wallet platform, via the API, a token associated with the merchant; (c) displaying the token to a consumer; (d) receiving, from the virtual wallet platform, a packet associated with the consumer, the packet including personal identifying information for the consumer; (e) populating an application for registration of the consumer for the loyalty account, displayed at the computing device, with the personal identifying information included in the packet; and (f) upon an input from the consumer, enrolling the consumer in a loyalty program associated with the merchant, based on the personal identifying information included in the packet, and providing the loyalty account to the consumer in connection with such enrollment in the loyalty program.

As will also be appreciated based on the foregoing specification, the above-described embodiments of the disclosure may be implemented using computer programming or engineering techniques including computer software, firmware, hardware or any combination or subset thereof, wherein the technical effect may further be achieved by performing at least one of the following steps: (a) in response to a request related to enrollment of a consumer for a loyalty account provided by a merchant, transmitting, by a virtual wallet platform, a token to the merchant; (b) receiving, at the virtual wallet platform, the token from a consumer, via a wallet application installed at a communication device associated with the consumer; (c) in response to the token, when received from the wallet application, compiling and transmitting, by the virtual wallet platform, to the merchant, a packet of personal identifying information for the consumer, thereby permitting the merchant to populate the personal identifying information into an application for enrollment of the consumer for the loyalty account.

Exemplary embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular exemplary embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," "coupled to," "associated with," included with," or "in communication with" another element or layer, it may be directly on, engaged, connected or coupled to, associated with, or in communication with the other element or layer, or intervening elements or layers may be present. As used herein, the term "and/or" includes any and all combinations of one or more of the associated listed items.

Although the terms first, second, third, etc. may be used herein to describe various features, these features should not be limited by these terms. These terms may be only used to distinguish one feature from another. Terms such as "first," "second," and other numerical terms when used herein do not imply a sequence or order unless clearly indicated by the context. Thus, a first feature discussed herein could be termed a second feature without departing from the teachings of the example embodiments.

In addition, as used herein, a product may include a good, a service, etc.

None of the elements/features recited in the claims are intended to be a means-plus-function element within the meaning of 35 U.S.C. § 112(f) unless an element is expressly recited using the phrase "means for," or in the case of a method claim using the phrases "operation for" or "step for."

The foregoing description of exemplary embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A system for use in facilitating enrollment of a user in a program associated with a merchant, the system comprising:
   a memory including a data structure of account profiles for multiple users, the account profiles including personal identifying information for each of the multiple users;
   at least one virtual wallet platform computing device coupled to the memory and coupled in communication with a virtual wallet application associated with a merchant and included in a communication device associated with one of the multiple users, the at least one virtual wallet platform computing device configured to:
- in response to a request from the one of the multiple users for registration for a loyalty account with the merchant, receive a request for a token, via an application programming interface (API), from the merchant;
- transmit the token to the merchant, whereby the token is presented to the one of the multiple users, as a computer-readable indicia, in connection with an offer for the one of the multiple users to enroll in the loyalty account with the merchant, wherein the token is specific to the merchant and includes a merchant identifier for the merchant;
- receive the token and at least one parameter specified by the one of the multiple users, from the virtual wallet application of the communication device associated with the one of the multiple users;
- in response to the token and the at least one parameter, compile a packet of personal identifying information for the one of the multiple users, the packet including personal identifying information permitted by the at least one parameter and excluding personal identifying information for the one of the multiple users not permitted by the at least one parameter; and
- transmit the compiled packet for the one of the multiple users to the merchant, thereby permitting the merchant to populate the personal identifying information included in the packet into an application for enrollment of the one of the multiple users in the loyalty account with the merchant.

2. The system of claim 1, wherein the packet includes a mailing address, a date of birth, a gender, a phone number, a social security number, and an email address for the one of the multiple users.

3. The system of claim 1, wherein the at least one virtual wallet platform computing device is further configured to receive a request for a payment token from the merchant for a transaction to a payment account associated with the one of the multiple users and to transmit the payment token to the merchant, in response to the request.

4. The system of claim 1, further comprising the communication device associated with the one of the multiple users;
- wherein the at least one virtual wallet platform computing device is further configured to transmit the packet to the merchant via the virtual wallet application at the communication device; and
- wherein the communication device is configured, by the virtual wallet application, to:
  - capture the token when displayed by the merchant;
  - transmit the token to the at least one virtual wallet platform computing device; and
  - facilitate transmitting the packet to the merchant from the at least one virtual wallet platform computing device.

5. The system of claim 4, wherein the communication device is further configured, by the virtual wallet application, to authenticate the one of the multiple users and, after authenticating the one of the multiple users, to transmit the token to the at least one virtual wallet platform computing device.

6. The system of claim 5, wherein the communication device is further configured, by the virtual wallet application, to solicit the at least one parameter from the one of the multiple users, and upon receipt of the at least one parameter from the one of the multiple users, to transmit the at least one parameter to the at least one virtual wallet platform computing device.

7. A method for use in facilitating enrollment of a consumer in a loyalty program associated with a merchant, the method comprising:
- in response to a selection from a consumer for registration for a loyalty account with a merchant, calling, by a computing device associated with the merchant, an application programming interface (API) associated with a virtual wallet platform to request a token, the virtual wallet platform coupled in communication with a virtual wallet application associated with the computing device and included in a communication device associated with the consumer;
- receiving, at the computing device, from the virtual wallet platform, via the API, the token, wherein the token is specific to the merchant and includes a merchant identifier for the merchant;
- displaying, by the computing device, the token to the consumer as a computer-readable indicia, in connection with an offer for the consumer to enroll in the loyalty account, whereby in response the virtual wallet application at the communication device associated with the consumer provides the token to the virtual wallet platform together with at least one parameter specified by the consumer;
- receiving, by the computing device, from the virtual wallet platform, a packet including personal identifying information for the consumer permitted by the at least one parameter specified by the consumer and excluding personal identifying information for the consumer not permitted by the at least one parameter specified by the consumer;
- automatically populating an application for registration of the consumer for the loyalty account, displayed at the computing device, with the personal identifying information included in the packet; and
- upon an input from the consumer to the computing device, enrolling the consumer in a loyalty program associated with the merchant, based on the personal identifying information included in the packet, and providing the loyalty account to the consumer in connection with such enrollment in the loyalty program.

8. The method of claim 7, wherein the token includes a QR code; and
- wherein displaying the token to the consumer includes displaying the QR code to the consumer.

9. The method of claim 7, wherein the personal identifying information includes a mailing address, a date of birth, a gender, and an email address for the consumer.

10. The method of claim 7, wherein the computing device includes a kiosk associated with the merchant.

11. The method of claim 7, further comprising:
- requesting, by the computing device, a payment token from the virtual wallet platform; and
- transmitting, by the computing device, an authorization request for a transaction to a transacting institution, the transaction including at least one fee associated with the loyalty account, and the authorization request including at least the payment token and an amount of the fee.

12. The method of claim 11, further comprising soliciting consent from the consumer prior to requesting the payment token from the virtual wallet platform.

13. The method of claim 7, wherein receiving the packet associated with the consumer includes receiving the packet, from the virtual wallet platform, via the virtual wallet application at the communication device associated with the consumer.

14. A method for use in facilitating enrollment of a consumer in a loyalty program associated with a merchant, the method comprising:

in response to a request for a token from a merchant related to enrollment of a consumer for a loyalty account provided by the merchant, transmitting, by a virtual wallet platform, the token to the merchant, the token specific to the merchant and representative of a merchant identifier for the merchant, the virtual wallet platform coupled in communication with the merchant and with a wallet application included at a communication device associated with the consumer, thereby permitting the merchant to present the token to the consumer at the wallet application, as a computer-readable indicia, in connection with an offer for the consumer to enroll in the loyalty account with the merchant;

receiving, at the virtual wallet platform, the token and at least one parameter specified by the consumer from the communication device associated with the consumer, via the wallet application installed at the communication device;

in response to the token and the at least one parameter, when received from the wallet application, compiling, by the virtual wallet platform, a packet including personal identifying information for the consumer permitted by the at least one parameter specified by the consumer and excluding personal identifying information for the consumer not permitted by the at least one parameter specified by the consumer; and transmitting the compiled packet for the consumer to the merchant, thereby permitting the merchant to automatically populate the personal identifying information into an application for enrollment of the consumer for the loyalty account.

15. The method of claim 14, further comprising soliciting the at least one parameter indicative of the personal identifying information to be included in the packet.

16. The method of claim 15, wherein the at least one parameter includes a selection of a mailing address.

17. The method of claim 14, wherein the personal identifying information includes a date of birth, a gender, and a social security number of the consumer.

18. The method of claim 14, further comprising authenticating the consumer; and wherein receiving the token from the consumer includes receiving the token from the authenticated consumer.

19. The method of claim 14, further comprising receiving a request for a payment token from the merchant; and transmitting, by the virtual wallet platform, the payment token to the merchant, in response to the request.

* * * * *